June 5, 1962

J. W. MURPHY 3,038,063

COMBINATION FLOOD AND TAIL LAMP

Filed Oct. 23, 1959

INVENTOR.
Joe W. Murphy
BY
G. E. McGlynn Jr.
ATTORNEY

June 5, 1962 J. W. MURPHY 3,038,063
COMBINATION FLOOD AND TAIL LAMP
Filed Oct. 23, 1959 2 Sheets-Sheet 2

INVENTOR.
Joe W. Murphy
BY
ATTORNEY

United States Patent Office

3,038,063
Patented June 5, 1962

3,038,063
COMBINATION FLOOD AND TAIL LAMP
Joe W. Murphy, Anderson, Ind., assignor to General Motors Corporation, Detroit, Mich., a corporation of Delaware
Filed Oct. 23, 1959, Ser. No. 848,326
14 Claims. (Cl. 240—8.3)

This invention pertains to a multi-purpose or dual lamp assembly and, in particular, to a combination flood and tail lamp assembly of the type employed on agricultural and construction vehicles and the like.

With respect to the following detailed description of a preferred embodiment of the invention as incorporated in a combination flood and tail lamp assembly for use as aforementioned, it may be noted that prior lamps of this type have been characterized by a main flood lamp assembly comprising a sealed lens and reflector enclosing a flood lamp filament to provide white flood light, and an auxiliary tail light assembly including a bulb for providing tail light illumination. Additionally, it has been the practice to form a transparent window or small translucent area in the reflector of the main or flood unit to permit tail light rays to pass therethrough and through the flood lamp lens to provide tail light illumination. Inasmuch as State specifications require that such tail light be red in color, the aforementioned reflector window has been painted red.

Several problems have been presented by such prior constructions. In the first instance, due to vehicle vibration and the like, the main or flood lamp unit shifts relative to the tail light bulb thereby preventing rays from the latter from passing through the reflector window or translucent area in optimum fashion. Secondly, because the lens of the main or flood lamp unit includes flutes or other optical elements to spread the flood light to a relatively great extent, difficulty has been encountered in providing tail light illumination of sufficient intensity or concentration to meet State regulations. Additionally, multi-purpose lamps of this type have been relatively complex and cumbersome in construction for various reasons including the need for separate fixtures for mounting the flood and tail lamp units and separate wiring therefor.

It is, therefore, a principal object and feature of this invention to provide an improved multi-purpose or dual lamp assembly of the type aforementioned and, in particular, a combination flood and tail lamp of simplified construction and improved reliability while requiring fewer structural parts in mounting the assembly and less wiring for selectively energizing the flood and tail lamp light sources.

More specifically, it is a principal object and feature of this invention to provide a combination lamp assembly of the type aforementioned in which the tail lamp bulb is fixedly located in a predetermined position with respect to the reflector of the main flood unit whereby vibrations and other external forces cannot inadvertently and undesirably dislocate the tail light bulb with respect to the small translucent area in the reflector of the main flood unit, thereby causing tail light rays at all times to be directed toward the lens of the main flood unit in an optimum fashion.

It is yet another object and feature of this invention to provide a combination flood and tail lamp assembly of the type aforementioned in which the reflector and lens of the main flood unit are provided with suitable optical elements cooperating to receive and distribute a relatively concentrated tail light beam from the bulb of the tail lamp unit so as to meet State regulations with respect to tail light illumination.

It is yet another specific object and feature of this invention to provide a combination lamp assembly of the type aforementioned in which the tail light assembly is so located with respect to the terminal structure for the flood light filament that a single common electrical ground may be employed for both the flood light filament and the tail light bulb, thereby reducing the amount of electrical wiring required.

With reference to the preferred embodiment of the invention as illustrated in a combination flood and tail lamp assembly, these and other objects of this invention are attained, in general, in an assembly comprising a lens and reflector joined together about their peripheries to form a sealed flood lamp envelope. Suitable electrical power input and ground terminals are formed on the base of the reflector of the flood unit, and are electrically connected to a flood light filament located substantially at the focal point of the reflector within the sealed envelope. The tail light assembly includes a socket fixedly supported on the ground terminal structure of the flood unit, and is adapted to removably receive a tail light bulb so that the latter will be positioned immediately adjacent the rear surface of the reflector. A relatively small red-colored translucent area in the reflector is disposed immediately adjacent the externally located tail light bulb, and includes on its interior surface a light concentrating optical button and surrounding annular optical prism ring for receiving and directing the majority or a selected portion of the tail light rays from the bulb toward the central portion of the inner surface of the flood lamp lens. A plurality of light distributing optical elements on the central portion of the inner surface of the lens receive and distribute the aforementioned selected red tail light rays in a relatively concentrated pattern, while additional light distributing optical elements on the remaining portion of the inner surface of said lens and surrounding the central portion aforementioned receive and distribute white flood light rays in a relatively widespread pattern. Thus, the tail light assembly is fixedly located with respect to the translucent area in the reflector so that vibrations and other external forces will not dislodge the tail lamp bulb from its position with respect to the optical elements on the reflector and lens to distribute tail light illumination in an optical fashion. Moreover, inasmuch as the tail light socket is mounted on the ground terminal structure for the flood lamp filament, a single ground wire may be employed in grounding both light sources.

The manner in which these and other objects of this invention are attained will become more apparent hereinafter as the description of the invention proceeds, and in which reference is made to the following drawings in which.

Figures 1, 2:
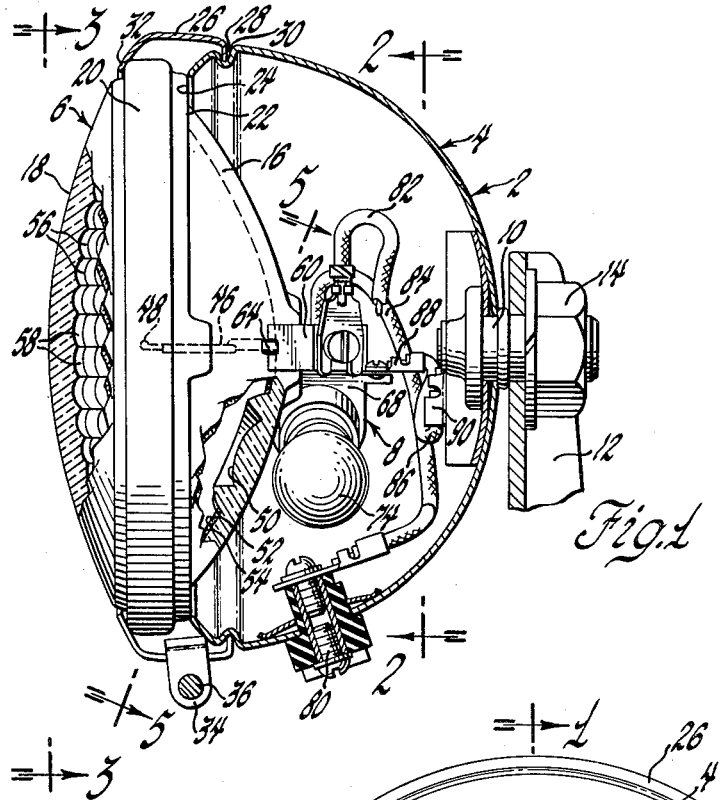
FIGURE 1 is a section, partly broken away to illustrate certain details, taken on line 1—1 of FIGURE 2, and illustrating a preferred embodiment of the invention.
FIGURE 2 is a rear view of the lamp assembly broken away to illustrate the details of certain internal parts thereof.

Referring now to the drawings and a detailed description of a preferred embodiment of the invention, the combination flood and tail lamp assembly indicated generally at 2 may be seen to comprise a recessed or cup-shaped metal body member 4, an all glass sealed beam flood lamp unit 6, and a tail lamp assembly 8. A body mounting stud 10 is suitably secured to the central base portion of the body 4, and has a threaded end adapted to be received through a suitable support 12 and engaged by nut 14 to mount the body 4. As aforementioned, such combination lamp assemblies are commonly employed on agricultural and construction type vehicles and the like and, in which instance, the assembly will usually be mounted on a suitable support 12 so that the sealed flood unit 6 faces rearwardly of the vehicle toward the area in which a plow or other agricultural implement or earth-working apparatus such as a scraper bowl is operating. Additionally, the mechanical or optical axis of the assembly is usually inclined approximately 25° to 30° downwardly from a horizontal plane.

The all glass sealed beam flood lamp unit 6 comprises the well known all glass parabolic reflector 16 and dished lens 18 having their peripheries sealed together at a fused juncture or annular rim 20 thereby defining a sealed envelope. The sealed flood unit includes a seating plane 22 adapted to be removably positioned against the seating surface 24 of body 4 by means of a split-ring door 26 having a rearward annular flange 28 seated within a suitable annular groove 30 near the forward edge of the body, while the forward annular edge 32 of the door or ring is turned radially inwardly so as to embrace the fused juncture 20 of the unit. The opposed radially projecting ears 34 at the ends of the door are adapted to be drawn together by means of a fastener 36 thereby tightening the door down about the fused juncture of the unit and within the groove 30 to support the unit.

In the process of molding or otherwise forming the all glass reflector 16, a pair of spaced rearwardly projecting bosses 38 and 40 are formed integral with the rear surface thereof substantially centrally of the reflector. According to conventional manufacturing practice, a pair of metal thimble-like ferrules 42 and 44 are suitably imbedded upon the respective bosses 38 and 40, and include cavities communicating with passages leading through the respective bosses to the interior of the lamp envelope. Again according to conventional practice, an electrical power input terminal and a ground terminal are suitably mechanically and electrically secured within the respective recesses of the thimbles or ferrules 42 and 44, extend therefrom through the passages in the respective bosses 38 and 40 into the interior of the sealed lamp envelope. The ground lead wire is indicated at 46 in FIGURE 1, it being understood that the power input lead wire is positioned adjacent thereto with both lead wires in a plane passing substantially through the focal point of the reflector 16. A conventional filament 48 is connected between the free ends of the respective lead wires aforementioned so as to be located substantially of the focal point of the reflector.

A light concentrating optical button 50 and surrounding annular optical prismatic ring 52 are molded or otherwise formed integrally with the interior surface of the reflector immediately below and substantially equidistantly spaced from the respective bosses 38 and 40. Substantially the entire interior surface of the reflector 16 is suitably provided with a reflective coating indicated at 54 according to conventional practices, while leaving a relatively small translucent or transparent area defined by the circular configuration of the optical ring 52 and button 50. At least the rear surface of the reflector 16 defined by the projection of the optical button and ring aforementioned are suitably provided with a translucent or transparent red coating. In this regard, it is desirable to coat the entire rear surface of the reflector including its flange to prevent white light from being piped or otherwise transmitted therethrough when the tail light is illuminated.

The concavely dished all glass lens 18 has molded or otherwise suitably formed on the inner surface thereof a plurality of rows of optical light directing and diffusing optical flutes 56 surrounding a central portion of the lens provided with two contiguous elongate rows of flutes 58. The junction of the two rows of flutes 58 is contained in a plane passing substantially through the focal point of the reflector 16. The groups of flutes 56 and 58 are, in and of themselves, of conventional construction and are formed using conventional manufacturing practices. Suffice it to say that both groups of flutes comprise individual flutes which are vertically concavely curved in cross section as shown particularly in FIGURE 1. However, each flute of the group of flutes 56 has a greater radius of curvature than the flutes 58. As a result, light rays passing through the group of flutes 56 will be spread relatively widely vertically and horizontally as compared to light passing through the centrally located flutes 58 which serve to concentrate, relatively speaking, the light rays passing therethrough. More specifically, according to manufacturing practices well known in the art, the flutes 56 are conveniently formed so as to spread the light rays passing therethrough in arcs of approximately 80° horizontally and 30° vertically substantially symmetrically about the optical or mechanical axis of the sealed unit. On the other hand, light passing through the centrally located flutes 58 will be relatively condensed in that the light rays will be spread in arcs of only approximately 24° horizontally and 12° vertically again symmetrically about the optical or mechanical axis of the assembly. Thus, it will be seen that light rays from any common source which pass through both groups of flutes 56 and 58 will result in a relatively widespread beam pattern due to the rays passing through the flutes 56 and a relatively more intense, more concentrated beam pattern resulting from the rays passing through the flutes 58.

Terminal clips or brackets 60 and 62 are substantially identical to each other, and are provided with suitable apertures adjacent one end thereof to receive the ends of the respective ferrules 42 and 44. The terminal brackets are suitably mechanically and electrically secured to the ferrules, as by soldering, and each extends outwardly from its respective ferrule and is bowed axially forwardly of the axis of the lamp structure where a notch on the ends thereof seat on the respective lugs 64 molded on the rear surface of the reflector. While the cooperation of the lugs 64 with respect to the outboard ends of the terminal brackets aid in supporting the latter, the principal purpose of this arrangement is to maintain the terminal brackets in position on the ferrules as the sealed lamp unit is subjected to the soldering operation for securing the terminal brackets to the respective ferrules.

The conventional tail light socket 66 is suitably secured to a mounting bracket 68 having a mounting ear 70 adapted to embrace the ground terminal bracket 62, and is secured to this bracket by any suitable fastener such as the screw 72. A conventional tail light bulb 74 includes base 76 adapted to be removably received within the socket 66, the latter being so arranged relative to the sealed lamp unit that the bulb, when in position, will be disposed immediately behind and adjacent the window or translucent portion in the reflector with the tail lamp filament substantially aligned with the optical axis of the button 50 and ring 52.

Figure 3:
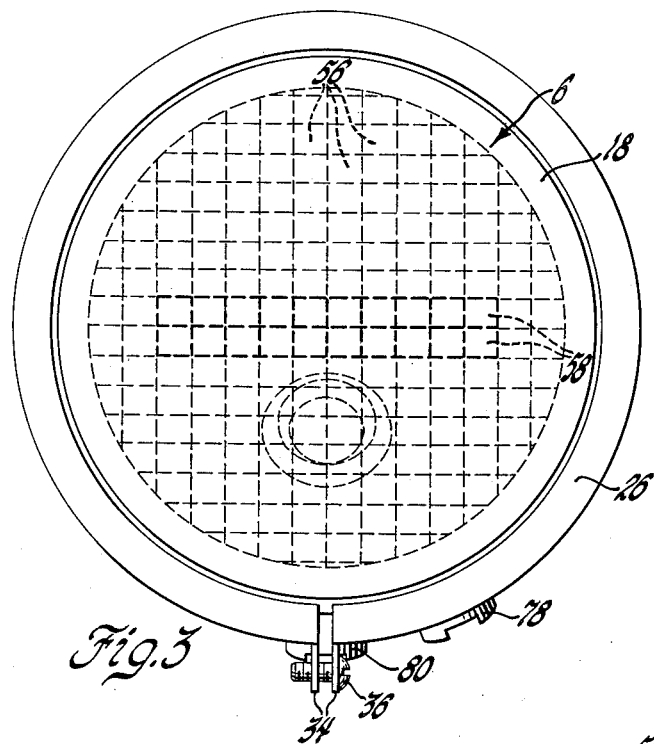
FIGURE 3 is a front view of the assembly taken on line 3—3 of FIGURE 1.
Figure 5:
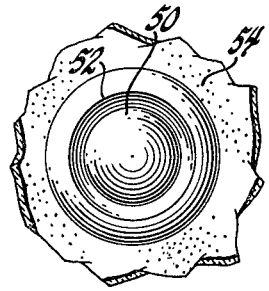
FIGURE 5 is a fragmentary view taken on line 5—5 of FIGURE 1.
Figure 4:
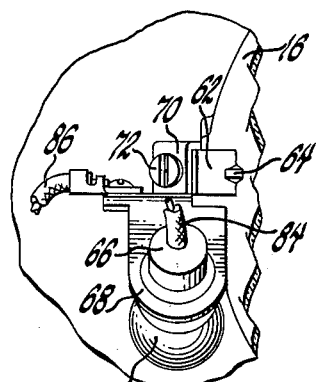
FIGURE 4 is a fragmentary view taken on line 4—4 of FIGURE 2.

Referring particularly to FIGURES 1, 2 and 3, it may be seen that the body member 4 mounts in any desired and suitable fashion the circumferentially spaced terminal or connector blocks 78 and 80. Each of these electrical connectors is adapted to be electrically connected through suitable conductors to a source of electrical power such as the battery of the vehicle equipped with the assembly of this invention. Moreover, it will be realized that suitable switch means is provided to selectively connect one or the other of the connectors 78 and 80 to the power source to selectively energize the sealed lamp unit or tail lamp unit through conductors to be described. The connector 78 is electrically connected by conductor 82 to the power input terminal bracket 60 of the flood lamp unit. The connector 80, in similar fashion, is connected by the conductor 84 to the base of the tail light socket 66. A single ground conductor 86 is connected between the bracket 68 as indicated at 88 and the body member 4 as indicated at 90.

Referring now to the operation of the inventive assembly, it may be assumed that the latter is mounted on an agricultural tractor so that the assembly is pointing rearwardly and preferably downwardly as aforedescribed to illuminate the area in which plows or other agricultural implements are working. Assuming that the tractor is working in a field, the light switch mechanism will be manipulated so that tail light bulb 74 is de-energized while power is conducted through the conductor 82 to the filament 48 and thence through the ground lead wire 46, ground terminal bracket 62, socket mounting bracket 68 and conductor 86 to ground. As a result, white light rays will be directed toward the entire inner surface of the lens 18. Light rays passing through the flutes 56 will be spread to the desired extent and preferably as aforedescribed to provide a relatively widespread beam pattern of white light for general illumination of the working area. The flood light rays passing through the central located flutes 58 will be relatively more condensed so as to provide a certain portion of "hot spot" light in the flood light pattern.

Assuming now that the agricultural tractor leaves the field and enters a highway or other road travelled by conventional vehicles, the flood filament 48 is de-energized and the tail light bulb 74 energized. At this time, current flows through the conductor 84 to the base of the socket, through the bulb filament and the base 76 of the bulb back to the socket body 66 in a conventional manner. Inasmuch as the mounting bracket 68 is mechanically connected to the socket 66, the tail light circuit is grounded through the same conductor 86 as is used for grounding the flood filament circuit. The light emitted from the tail light bulb 74 passes through the red-colored window of the reflector 16 and is condensed and directed by the optical button 50 and ring 52 toward the two rows of centrally located optical flutes 58 on the lens 18. While any selected portion of the light rays from the bulb 74 may be so directed, it is preferable that the majority of the light rays passing through the window or translucent area in the reflector be directed into the area of the flutes 58. The flutes 58 on the reflector then direct the red tail light beam down the road with an intensity or concentration which meets State specifications for tail light illumination.

It will therefore be seen that the aforedescribed lamp assembly insures that the tail light bulb 74 will always be properly oriented with respect to the reflector 16 inasmuch as the two are fixedly joined together in a predetermined relationship. Moreover, the combination of the optical button 50, prismatic ring 52 and centrally located flutes 58 cooperate to provide a tail light beam intense enough for tail light illumination thereby meeting State regulations. Moreover, the flutes 58 provide a "hot spot" portion for the widespread flood light beam pattern. Additionally, the tail light socket construction is so located with respect to the ground terminal bracket 62 of the flood filament 48 so as to require but a single conductor 86 to ground both the flood and tail light circuits.

While but one form of the invention has been selected for a description thereof, other forms will be apparent to those skilled in the art. Therefore, the embodiment shown in the drawings is merely for illustrative purposes, and is not intended to limit the scope of the invention which is defined by the claims which follow.

I claim:

1. A dual lamp assembly comprising a lens and reflector joined together to form a lamp envelope, a primary light source supported within said envelope, a secondary light source mounted adjacent the rear surface of said reflector, a relatively small translucent area on said reflector adjacent said secondary light source including optical light receiving and directing means receiving and directing selected light rays from said secondary source toward a selected portion of said lens, a plurality of light distributing optical element means on the selected portion of said lens distributing said selected light rays from said secondary source in a relatively concentrated beam pattern, and additional light distributing optical element means on the remaining portion of said lens distributing light rays from said primary source in a relatively widespread beam pattern.

2. A dual lamp assembly comprising a lens and reflector joined together to form a lamp envelope, a primary light source supported within said envelope, a secondary light source mounted adjacent the rear surface of said reflector, a relatively small translucent area on said reflector including an optical button and surrounding annular optical prism ring on the inner surface of said reflector, said button and ring being adapted to receive and direct selected light rays from said secondary source toward the central portion of the inner surface of said lens, a plurality of light distributing optical elements on the central portion of the inner surface of said lens distributing said selected light rays from said secondary source in a relatively concentrated beam pattern, and additional light distributing optical elements on the remaining portion of the inner surface of said lens around said central portion distributing light rays from said primary source in a relatively widespread beam pattern.

3. A combination flood and tail lamp comprising a lens and reflector joined together to form a lamp envelope, a flood light filament supported within said enevelope, a tail light bulb mounted adjacent the rear surface of said reflector, a relatively small translucent area on said reflector adjacent said bulb including optical light receiving and directing means receiving and directing selected tail light rays from said bulb toward a selected portion of said lens, a plurality of light distributing optical element means on said selected portion of said lens distributing said selected tail light rays in a relatively concentrated beam pattern, and additional light distributing optical element means on the remaining portion of said lens distributing light rays from said flood light filament in a relatively widespread beam pattern.

4. A combination flood and tail lamp comprising a lens and reflector joined together to form a lamp envelope, a flood light filament supported within said envelope, a tail light bulb mounted immediately adjacent the rear surface of said reflector, a relatively small translucent area on said reflector including optical light receiving and directing means receiving and directing selected tail light rays from said bulb toward a selected portion of said lens, a plurality of light distributing optical element means on said selected portion of said lens distributing said selected tail light rays in a relatively concentrated beam pattern, and additional light distributing optical element means on the remaining portion of said lens distributing light rays from said flood light filament in a relatively widespread beam pattern.

5. A combination flood and tail lamp comprising a lens and reflector joined together to form a lamp envelope, a flood light filament supported within said envelope, a tail light bulb mounted immediately adjacent the rear surface of said reflector, a relatively small translucent area on said reflector including an optical button and surrounding annular optical prism ring on the inner surface of said reflector, said button and ring receiving and directing selected tail light rays from said bulb toward a selected portion of said lens, a plurality of light distributing optical elements on said selected portion of said lens distributing said selected tail light rays in a relatively concentrated beam pattern, and additional light distributing optical elements on the remaining portion of said lens distributing light rays from said flood light filament in a relatively widespread beam pattern.

6. A combination flood and tail lamp comprising a lens and reflector joined together to form a lamp envelope, a flood light filament supported within said envelope, a tail light bulb mounted immediately adjacent the rear surface of said reflector, a relatively small colored translucent area on said reflector including an optical button and surrounding annular optical prism ring on the inner surface of said reflector, said button and ring receiving and directing selected tail light rays from said bulb toward the central portion of the inner surface of said lens, a plurality of light distributing optical elements on the central portion of the inner surface of said lens distributing said selected tail light rays in a relatively concentrated beam pattern, and additional light distributing optical elements on the remaining portion of the inner surface of said lens around said central portion distributing light rays from said flood light filament in a relatively widespread pattern.

7. A combination flood and tail lamp comprising a lens and reflector joined together about their peripheries to form a sealed envelope, a flood light filament supported from said reflector substantially at the focal point of the latter within said envelope, a tail light bulb mounted immediately adjacent the rear surface of said reflector, a relatively small red-colored translucent area on said reflector including an optical button and surrounding annular optical prism ring on the inner surface of said reflector, said button and ring receiving and directing tail light rays from said bulb toward the central portion of the inner surface of said lens, a plurality of light distributing optical elements on the central portion of the inner surface of said lens distributing said selected tail light rays in a relatively concentrted beam pattern, and additional light distributing optical elements on the remaining portion of the inner surface of said lens around said central portion distributing light rays from said flood light filament in a relatively widespread beam pattern.

8. A combination flood and tail lamp comprising a lens and reflector joined together to form a lamp envelope, a terminal structure on the base of said reflector externally of said envelope, a flood light filament electrically connected to said terminal structure and supported within said envelope, a tail light socket fixedly secured on said terminal structure, a tail light bulb removably insertable within said socket and positioned immediately adjacent the rear surface of said reflector, a relatively small translucent area on said reflector adjacent said bulb including optical light receiving and directing means receiving and directing selected tail light rays from said bulb toward a selected portion of said lens, a plurality of light distributing optical element means on said selected portion of said lens distributing said selected tail light rays in a relatively concentrated beam pattern, and additional light distributing optical element means on the remaining portion of said lens distributing light rays from said flood light filament in a relatively widespread beam pattern.

9. A combination flood and tail lamp comrising a lens and reflector joined together to form a lamp envelope, a terminal structure on the base of said reflector externally of said envelope, a flood light filament electrically connected to said terminal structure and supported within said envelope, a tail light socket fixedly secured on said terminal structure, a tail light bulb removably insertable within said socket and positioned immediately adjacent the rear surface of said reflector, a relatively small translucent area on said reflector including optical light receiving and directing means receiving and directing selected tail light rays from said bulb toward a selected portion of said lens, a plurality of light distributing optical element means on said selected portion of said lens distributing said selected tail light rays in a relatively concentrated beam pattern, and additional light distributing optical elements means on the remaining portion of said lens distributing light rays from said flood light filament in a relatively widespread beam pattern.

10. A combination flood and tail lamp comprising a lens and reflector joined together to form a lamp envelope, a terminal structure on the base of said reflector externally of said envelope, a flood light filament electrically connected to said terminal structure and supported within said envelope, a tail light socket fixedly secured on said terminal structure, a tail light bulb removably insertable within said socket and positioned immediately adjacent the rear surface of said reflector, a relatively small translucent area on said reflector including an optical button and surrounding annular optical prism ring on the inner surface of said reflector, said button and ring being adapted to receive and direct selected tail light rays from said bulb toward a selected portion of said lens, a plurality of light distributing optical elements on said selected portion of said lens distributing said selected tail light rays in a relatively concentrated beam pattern, and additional light distributing optical elements on the remaining portion of said lens distributing light rays from said flood light filament in a relatively widespread beam pattern.

11. A combination flood and tail lamp comprising a lens and reflector joined together to form a lamp envelope, a terminal structure on the base of said reflector externally of said envelope, a flood light filament electrically connected to said terminal structure and supported within said envelope, a tail light socket fixedly secured on said terminal structure, a tail light bulb removably insertable within said socket and positioned immediately adjacent the rear surface of said reflector, a relatively small colored translucent area on said reflector including an optical button and surrounding annular optical prism ring on the inner surface of said reflector, said button and ring being adapted to receive and direct selected tail light rays from said bulb toward the central portion of the inner surface of said lens, a plurality of light distributing optical elements on the central portion of the inner surface of said lens distributing said selected tail light rays in a relatively concentrated beam pattern, and additional light distributing optical elements on the remaining portion of the inner surface of said lens around said central portion distributing light rays from said flood light filament in a relatively widespread beam pattern.

12. A combination flood and tail lamp comprising a lens and reflector joined together to form a lamp envelope, an electrical power input terminal and a ground terminal on the base of said reflector, an electrical input lead wire and ground lead wire respectively connected to said input and ground terminals and extending into said envelope, a flood light filament connected between said lead wires within said envelope, a tail light socket supported on said ground terminal, a ground terminal connected to said socket, a tail light bulb removably insertable within said socket and positioned immediately adjacent the rear surface of said reflector, a relatively small translucent area on said reflector adjacent said bulb including optical light receiving and directing means receiving and directing selected tail light rays from said bulb toward a selected portion of said lens, a plurality of light distributing optical element means on said selected portion of said lens distributing said selected tail light rays in a relatively concentrated beam pattern, and addtional light distributing optical element means on the remaining portion of said lens distributing light rays from said flood light filament in a relatively widespread beam pattern.

13. A combination flood and tail lamp comprising a lens and reflector joined together to form a lamp envelope, an electrical power input terminal and a ground terminal on the base of said reflector, an electrical input lead wire and ground lead wire respectively connected to said input and ground terminals and extending into said envelope, a flood light filament connected between said lead wires within said envelope and located substantially at the focal point of said reflector, a tail light socket supported on said ground terminal, a ground terminal connected to said socket, a tail light bulb removably insertable within said socket and positioned immediately adjacent the rear surface of said reflector, a relatively small red-colored translucent area on said reflector including an optical button and surrounding annular optical prism ring on the inner surface of said reflector, said button and ring being adapted to receive and direct selected tail light rays from said bulb toward the central portion of the inner surface of said lens, a plurality of light distributing optical elements on the central portion of the inner surface of said lens distributing said selected tail light rays in a relatively concentrated beam pattern, and additional light distributing optical elements on the remaining portion of the inner surface of said lens around said central portion distributing light rays from said flood light filament in a relatively widespread beam pattern.

14. A dual lamp assembly comprising a lens and reflector joined together to form a lamp envelope, a primary light source supported within said envelope, a secondary light source mounted adjacent the rear surface of said reflector, a translucent colored coating on the entire rear surface of said reflector, a relatively small translucent area on said reflector adjacent said secondary light source including optical light receiving and directing means receiving and directing selected light rays from said secondary source toward a selected portion on said lens, a plurality of light distributing optical element means on the selected portion of said lens distributing said selected light rays from said secondary source in a relatively concentrated beam pattern, and additional light distributing optical element means on the remaining portion of said lens distributing light rays from said primary source in a relatively widespread beam pattern.

References Cited in the file of this patent

UNITED STATES PATENTS

| | | |
|---|---|---|
| 1,225,472 | Morin | May 8, 1917 |
| 2,113,829 | Condon | Apr. 12, 1938 |
| 2,177,216 | Howard et al. | Oct. 24, 1939 |
| 2,218,807 | Breer et al. | Oct. 22, 1940 |
| 2,321,705 | Roper | June 15, 1943 |
| 2,719,215 | Hutton | Sept. 27, 1955 |
| 2,824,489 | Roper | Feb. 25, 1958 |

UNITED STATES PATENT OFFICE
CERTIFICATE OF CORRECTION

Patent No. 3,038,063                                  June 5, 1962

Joe W. Murphy

It is hereby certified that error appears in the above numbered patent requiring correction and that the said Letters Patent should read as corrected below.

Column 6, line 24, for "enevelope" read -- envelope --; line 63, after "relatively" insert -- concentrated --; column 7, line 20, after "directing" insert -- selected --.

Signed and sealed this 11th day of September 1962.

SEAL)
.ttest:

:RNEST W. SWIDER                                      DAVID L. LADD
.ttesting Officer                                           Commissioner of Patents